Patented Apr. 24, 1928.

1,667,052

UNITED STATES PATENT OFFICE.

WALTER SCHOELLER, ADOLF FELDT, MAX GEHRKE, AND ERICH BORGWARDT, OF BERLIN, GERMANY, ASSIGNORS TO FIRM: CHEMISCHE FABRIK AUF ACTIEN (VORM. E. SCHERING), OF BERLIN, GERMANY.

PHARMACEUTICAL PRODUCT.

No Drawing. Original application filed May 9, 1925, Serial No. 29,207, and in Germany June 2, 1924. Divided and this application filed June 1, 1926. Serial No. 113,078.

Our invention refers to pharmaceutical products and more especially to products obtained from amino metal mercapto benzene compounds; it further refers to the methods of making such products. The new products are distinguished from the amino metal mercapto benzene compounds by a greater stability of the watery solutions of their salts and by a more favorable chemo-therapeutical coefficient. We obtain them by causing phosgen or a phosgen substitute to act on the amino metal mercapto benzene sulfonic acid compounds or their salts.

If phosgen or a phosgen substitute is employed for acylisation, there are obtained products in which two equal benzene amino radicals are connected by the acyl of carbon dioxide to form a symmetrical urea compound according to the formula

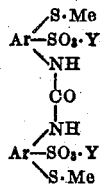

wherein Ar is a benzene nucleus, Me a heavy metal, Y hydrogen or a metal, more especially an alkali forming metal.

The new products are not easily soluble in water as acids, but easily soluble therein as alkali salts. In both forms they are soluble in alcohol only with difficulty. They are distinguished by their action on spirochaetae, more especially on spirochaeta pallida and recurrens. In their gold and silver compounds the metal forms part of a complex compound and cannot be traced by means of the usual precipitating agents. The new products are preferably used in the form of their soluble salts, more especially sodium salts, by subcutaneous or intravenous injection.

In producing the new compounds according to the present invention we preferably proceed as follows:

*Example.*—4,2 parts of 4-amino-2-auro mercapto benzene-1-sulfonic sodium are dissolved in 40 parts of water and phosgen is introduced until no further diazo reaction occurs. There is thus separated out the urea of the 4-amino-2-auro mercapto benzene-1-sulfonic acid, which is sucked off, well rinsed, dissolved in dilute caustic soda solution, whereupon the sodium salt

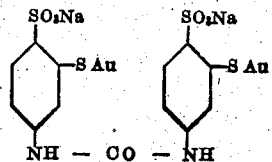

is precipitated with alcohol. This salt is a slightly yellow powder readily soluble in water and having a gold content of 42 per cent as compared with the theoretical 45 per cent.

We wish it to be understood that we do not desire to be limited to the exact substances, proportions, conditions and sequence of operations above described for obvious modifications will occur to a person skilled in the art.

In the appended claims the term "acid" is designed to include also the soluble salts of the respective acids.

We claim:—

1. As a new product, the derivative of an amino metal benzene compound corresponding to the formula

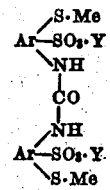

wherein Ar is a benzene nucleus, Me is a heavy metal, Y is hydrogen or a metal, more especially an alkali metal, such product as an acid dissolving only with difficulty, as an alkali salt readily in water and having a therapeutical effect more especially in cases caused by spirochaetae.

2. As a new product the sodium salt of the symmetric di-(meta-mercapto benzenepara-sulfonic acid) urea corresponding to the formula

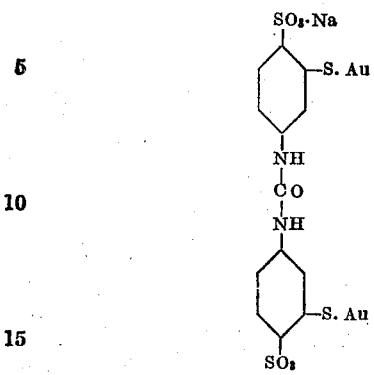

such compound being yellow colored and dissolving readily in water.

3. The method of producing new derivatives of amino metal mercapto compounds, consisting in acting on an amino metal mercapto benzene sulfonic acid with phosgen.

4. The method of producing new derivatives of amino metal mercapto compounds, consisting in acting on 4-amino-2-auro mercapto benzene-1-sulfonic acid with phosgen.

In testimony whereof we affix our signatures.

WALTER SCHOELLER.
ADOLF FELDT.
MAX GEHRKE.
ERICH BORGWARDT.